United States Patent

Ohmi et al.

[11] Patent Number: 6,135,155
[45] Date of Patent: *Oct. 24, 2000

[54] FLUID CONTROL DEVICE

[75] Inventors: Tadahiro Ohmi, Sendai; Michio Yamaji, Osaka; Hiroshi Morokoshi, Osaka; Shigeru Itoi, Osaka; Nobukazu Ikeda, Osaka; Tetsuya Kojima, Osaka, all of Japan

[73] Assignee: Fujikin Incorporated, Osaka, Japan

[*] Notice: Under 35 U.S.C. 154(b), the term of this patent shall be extended for 306 days.

[21] Appl. No.: 08/655,022

[22] Filed: May 29, 1996

[30] Foreign Application Priority Data

May 31, 1995 [JP] Japan ................................. 7-133708

[51] Int. Cl.[7] .................................................. F16K 11/10
[52] U.S. Cl. ............................. 137/884; 285/328
[58] Field of Search ............................ 137/884; 285/328, 285/379

[56] References Cited

U.S. PATENT DOCUMENTS

| 3,111,139 | 11/1963 | Bechett et al. | 137/884 |
| 5,366,261 | 11/1994 | Ohmi et al. | 285/328 |

Primary Examiner—John Fox
Attorney, Agent, or Firm—Armstrong, Westerman, Hattori, McLean & Naughton

[57] ABSTRACT

A regulator for regulating a flow rate is provided with an upper connector having a downwardly opened channel in communication with the regulator. An on-off valve connected to the regulator is provided with a lower connector having an upwardly opened channel in communication with the on-off valve. The upper connector is lapped over the lower connector and removably joined thereto with a screw so as to cause the downwardly opened channel to communicate with the upwardly opened channel. Accordingly, the regulator can be removed singly, for example, when malfunctioning.

1 Claim, 7 Drawing Sheets

FLUID CONTROL DEVICE

BACKGROUND OF THE INVENTION

The present invention relates to fluid control devices comprising a regulator, such as a mass flow controller for regulating a flow rate or pressure regulator for regulating pressure, and an on-off valve, or the like, in combination with the regulator.

Fluid control devices already known and comprising a regulator for regulating a flow rate or pressure, and an on-off valve or the like, include those wherein the regulator, and the on-off valve or the like, are connected together with screws screwed in sideways (see JP-A-172265/1993).

While regulators, such as flow rate-regulating mass flow controllers and pressure regulators, require frequent replacement due to a malfunction, the conventional fluid control device described must be removed in its entirety when the regulator is to be removed because the regulator is connected to the on-off valve or the like, with the screws which are inserted sideways. The replacement of the regulator therefore needs a time-consuming cumbersome procedure, and the device is inconvenient to maintain.

SUMMARY OF THE INVENTION

An object of the present invention is to provide a fluid control device from which a regulator can be removed singly in the event of a failure or malfunction.

The present invention provides a fluid control device comprising a regulator for regulating a flow rate or pressure, and a connection member connected to the regulator. The regulator is provided with an upper connector having a downwardly opened channel in communication with the regulator, and the connection member is provided with a lower connector having an upwardly opened channel in communication with the connection member. The upper connector overlaps, and is removably joined to, the lower connector so as to cause the downwardly opened channel to communicate with the upwardly opened channel.

Examples of connection members are an on-off valve, regulating valve, check valve, filter, block formed with a flow channel, etc.

With the fluid control device of the present invention, the regulator can be removed singly by separating the upper connector from the lower connector, so that the regulator, when its has malfunctioned, can be readily replaced. The device can therefore be maintained with an improved efficiency.

The lower connector may be removably attached to the connection member.

The upper connector may be removably attached to the regulator.

The upper connector may be joined to the lower connector with a screw screwed in from above the upper connector.

Preferably, a seal is provided between the upper connector and the lower connector, and the seal comprises an annular gasket interposed between abutting end faces of the upper connector and the lower connector, and a retainer having claws for holding an outer periphery of the gasket. The gasket can then be positioned in place by the retainer, rendering the seal repeatedly usable without becoming impaired in its sealing property.

DESCRIPTION OF THE PREFERRED EMBODIMENTS

Embodiments of the present inention will be described below with reference to the drawings. The terms "upper," "lower," "left" and "right" are used herein for the present device as it is viewed in the state shown in FIG. 1. The terms "upper" and "lower" are used for convenience of description. The device in the state of FIG. 1 may atternatively be installed as turned upside down or in a lateral position.

Figure 1:
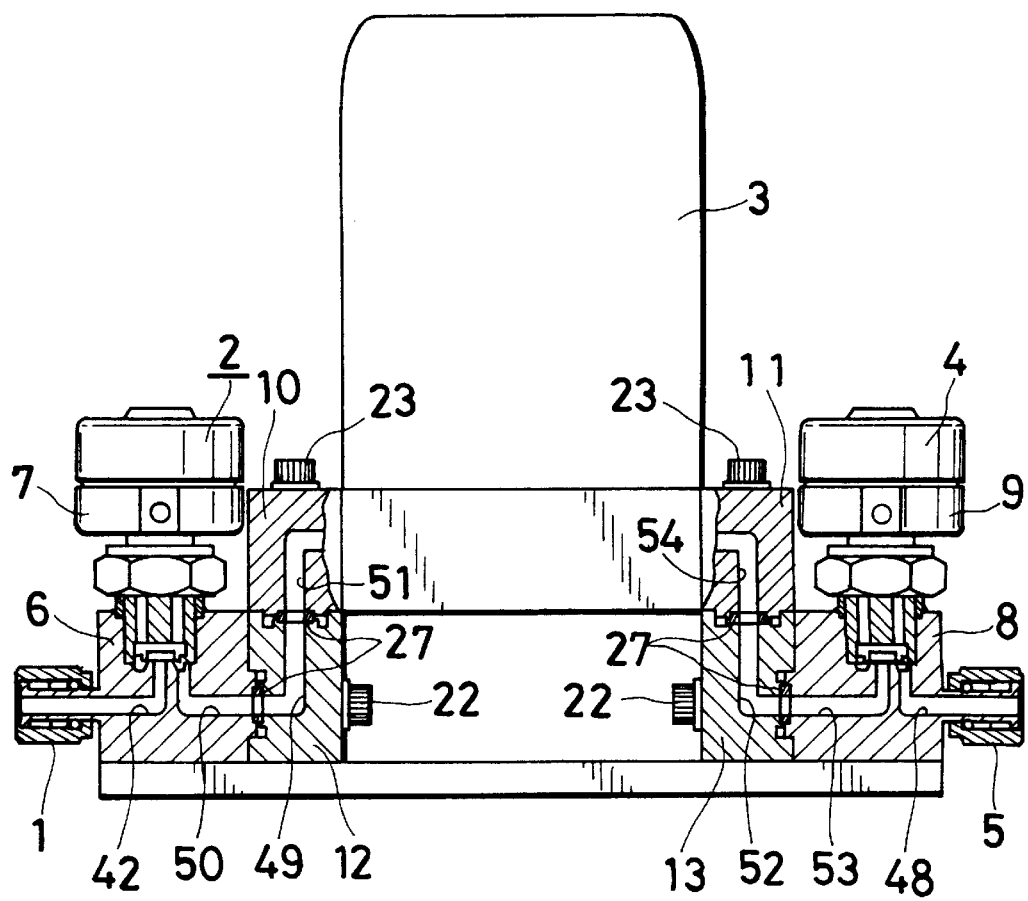
FIG. 1 is a view, partly in vertical section, showing a fluid control device embodying the invention.
Figure 2:
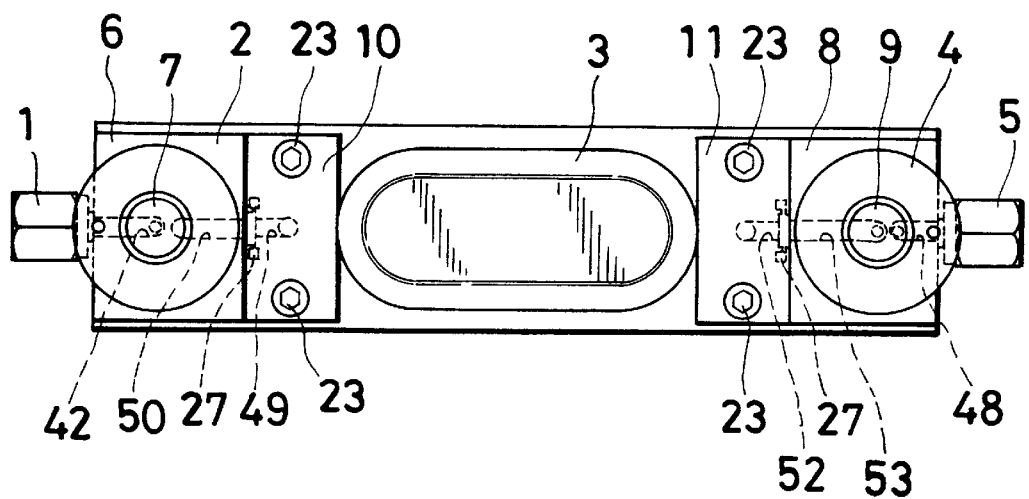
FIG. 2 is a plan view of the same.

FIGS. 1 and 2 show a fluid control device for use in semiconductor production apparatus. The device comprises, as arranged from left rightward, a fluid inlet portion 1, first on-off valve 2, mass controller (regulator) 3, second on-off valve 4 and fluid outlet portion 5. The first on-off valve 2 comprises a block-like body 6 having a leftwardly opened inlet channel 42 and a rightwardly opened outlet channel 50, and an actuator 7 for opening and closing the two channels 42, 50. Similarly, the second on-off valve 4 comprises a blocklike body 8 having a leftwardly opened inlet channel 53 and a rightwardly opened outlet channel 48, and an actuator 9 for opening and closing the two channels 53, 48.

The regulator 3 is provided at the left and right sides of its lower end portion with left and right upper channel blocks (left and right upper connectors) 10, 11 as projected in opposite directions. The left upper channel block 10 is formed with a downwardly opened inlet channel 51 in communication at its other end with an inlet channel (not shown) of the regulator 3. The right upper channel block 11 has a downwardly opened outlet channel 54 in communication at its other end with an outlet channel (not shown) the regulator 3. Although not shown, the channel blocks 10, 11 are fixed to the regulator 3 with screws driven in sideways.

Left and right lower channel blocks (left and right lower connectors) 12, 13 are provided beneath the left and right upper channel blocks 10, 11, respectively. The right face of the body 6 of the first on-off valve 2 is in contact with the left face of the left lower channel block 12, and the left face of the body 8 of the second on-off valve 4 with the right face of the right lower channel block 13.

The left lower channel block 12 is formed with an inlet channel 49 for holding the rightwardly opened outlet channel 50 of the first on-off valve 2 in communication with the downwardly opened inlet channel 51 of the left upper channel block 10. The right lower channel block 13 has an outlet channel 52 communicating with the downwardly opened outlet channel 54 of the right upper channel block 11 and with the leftwardly opened inlet channel 53 of the second on-off valve 4.

The body 6 of the first on-off valve 2 is joined to the left lower channel block 12 with a screw 22 driven into the block 12 from the right side thereof.

Similarly, the body 8 of the second on-off valve 4 is joined to the right lower channel block 13 with a screw 22 driven into the block 13 from the left side thereof. Furthermore, the upper channel blocks 10, 11 are joined to the respective lower channel blocks 12, 13 with screws 23 driven in from above the blocks 10, 11.

A seal portion 27 is provided between the first valve body 6 and the left lower channel block 12. As shown in detail in FIG. 3, the seal portion 27 comprises an annular gasket 32 interposed between the abutting end faces of the body 6 of the valve 2 and the block 12 at the position where the channels 50 and 49 communicate with each other, and a retainer 33 having claws 34 for holding the outer periphery of the gasket 32. The abutting end face of the valve body 6 and the abutting end face of the block 12 are formed respectively with gasket fitting recesses 36, 35 having a depth corresponding to about one-half of the thickness of the gasket 32. The bottom walls of the recessed portions 36, 35 have gasket holding annular projections 39, 38 each bearing on an inner peripheral portion of the gasket 32. The valve body 6 is formed with an annular furrow 37 outside the gasket fitting recess 36. The retainer 33 is held to the inner periphery of the furrowed portion 37. The inside diameter of the annular gasket 32 is approximately equal to the diameter of the outlet channel 50 in the body 6 of the first on-off valve 2 and to that of the inlet channel 49 in the left lower channel block 12, with the, result that when the joint portion is completely tightened up, the inner periphery of the gasket 32 becomes substantially flush with the inner periphery of the valve body 6 and with that of the block 12. Like seal portion 27 is interposed between the body 8 of the second on-off valve 4, between the upper channel blocks 10, 11 and the lower channel blocks 12, 13 and between the regulator 3 and the upper channel blocks 10, 11. The seal is repeatedly usable without becoming impaired in sealing property because the gasket 32 is positioned in place by the retainer 33. Since the regulator 3 is unlikely to be removed from each of the upper channel blocks 10, 11, the seal therebetween may be in the form of a hollow metal ring.

In the above arrangement, the upper channel blocks 10, 11 may be made integral with the regulator 3, whereas these blocks 10, 11, adapted to be fixed to the regulator 3 with screws, make it possible to use a known regulator 3 for fabricating the fluid control device of the invention. Similarly, the lower channel blocks 12, 13 may be made integral with the body 6 of the first on-off valve 2 and the body 8 of the second on-off valve 4, respectively, whereas the blocks 12, 13 adapted to be fixed to the respective valve bodies 6, 8 with screws make possible the use of known on-off valves 2, 4 for fabricating the fluid control device of the invention.

With the embodiment described, the mass flow controller is used as an example of regulator 3, and the on-off valves 2, 4 are used as examples of connection members to be connected to the regulator. However, a pressure regulator is alternatively usable as the regulator, and examples of useful connection members are a check valve, regulating valve, filter, a block formed with a flow channel, etc. These means are used in a suitable combination for constituting a fluid control device.

Figure 4:
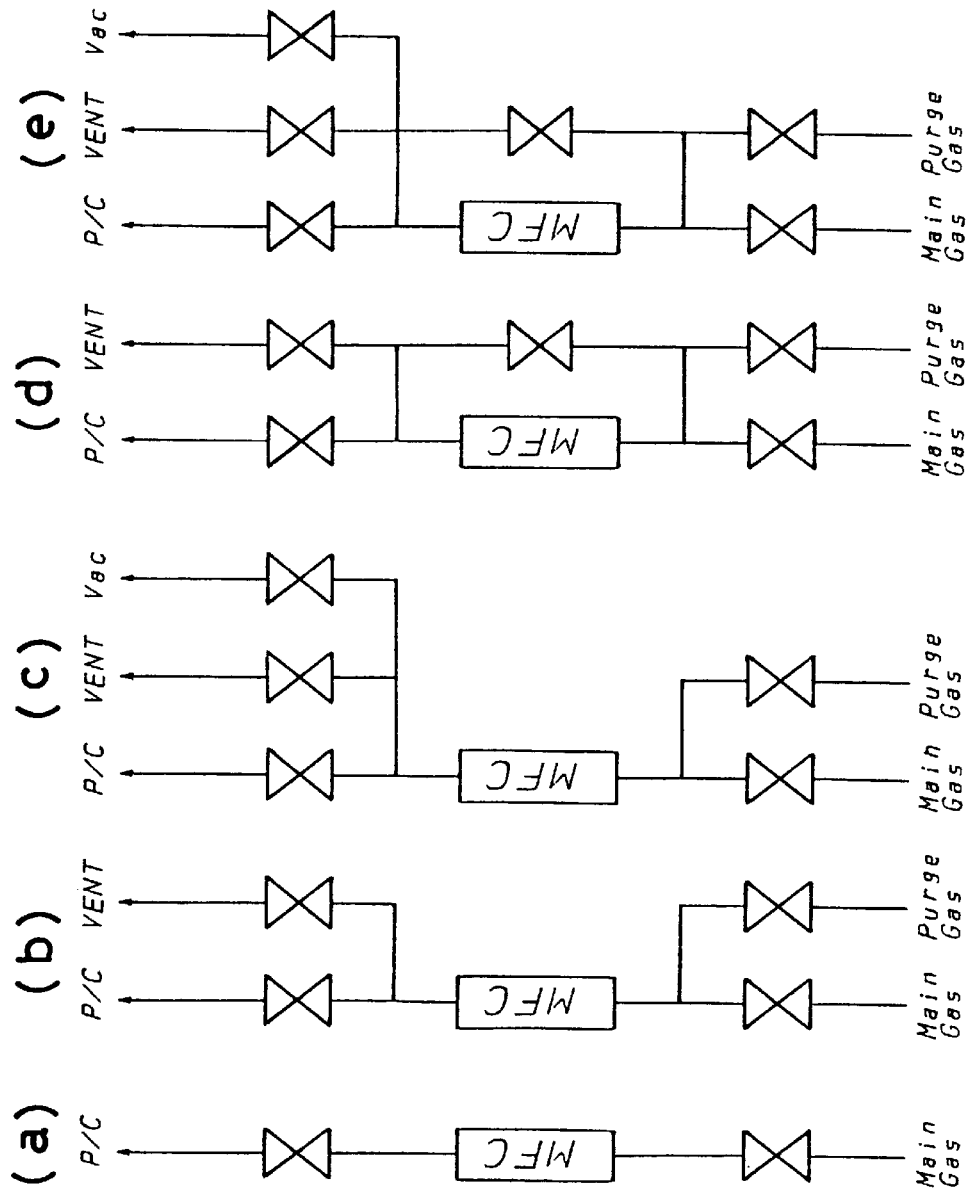
FIG. 4 is a diagram showing five patterns of fluid flow through fluid control devices embodying the invention.

While the two on-off valves 2, 4 are arranged respectively at the inlet side and the outlet side of the regulator 3 in the embodiment shown in FIGS. 1 and 2, the number of on-off valves to be provided at the inlet side of one regulator 3, as well as at the outlet side thereof, is suitably variable. FIG. 4 shows patterns of fluid flow through a mass flow controller (MFC). FIG. 4, (a) shows the pattern of the embodiment shown in FIGS. 1 and 2; an on-off valve for the main fluid is disposed at the inlet side of the mass flow controller, and an on-off valve for a process chamber (P/C) at the outlet side thereof. The pattern of FIG. 4, (b) is provided by an arrangement comprising a main fluid on-off valve and a purge fluid on-off valve which are arranged at the inlet side of the mass flow controller, and a process chamber on-off valve and a vent on-off valve (VENT) arranged at the outlet side of the controller. With the pattern of FIG. 4, (c), a main fluid on-off valve and a purge fluid on-off valve are arranged at the inlet side of the controller, and a process chamber on-off valve, vent on-off valve and evacuating on-off valve (Vac) at the outlet side of the controller. With the pattern of FIG. 4, (d), a main fluid on-off valve and a purge fluid on-off valve are arranged at the inlet side of the controller, a process chamber on-off valve and a vent on-off valve are arranged at the outlet side of the controller, and a channel change-over on-off valve is disposed between the inlet-side valves and the outlet-side valves. The pattern of FIG. 4, (e) is provided by an arrangement comprising a main fluid on-off valve and a purge fluid on-off valve disposed at the inlet side of the controller, a process chamber on-off valve, vent on-off valve and evacuating on-off valve disposed at the outlet side thereof, and a channel change-over on-off valve disposed between the valves at the inlet side and those at the outlet side.

Figure 3:
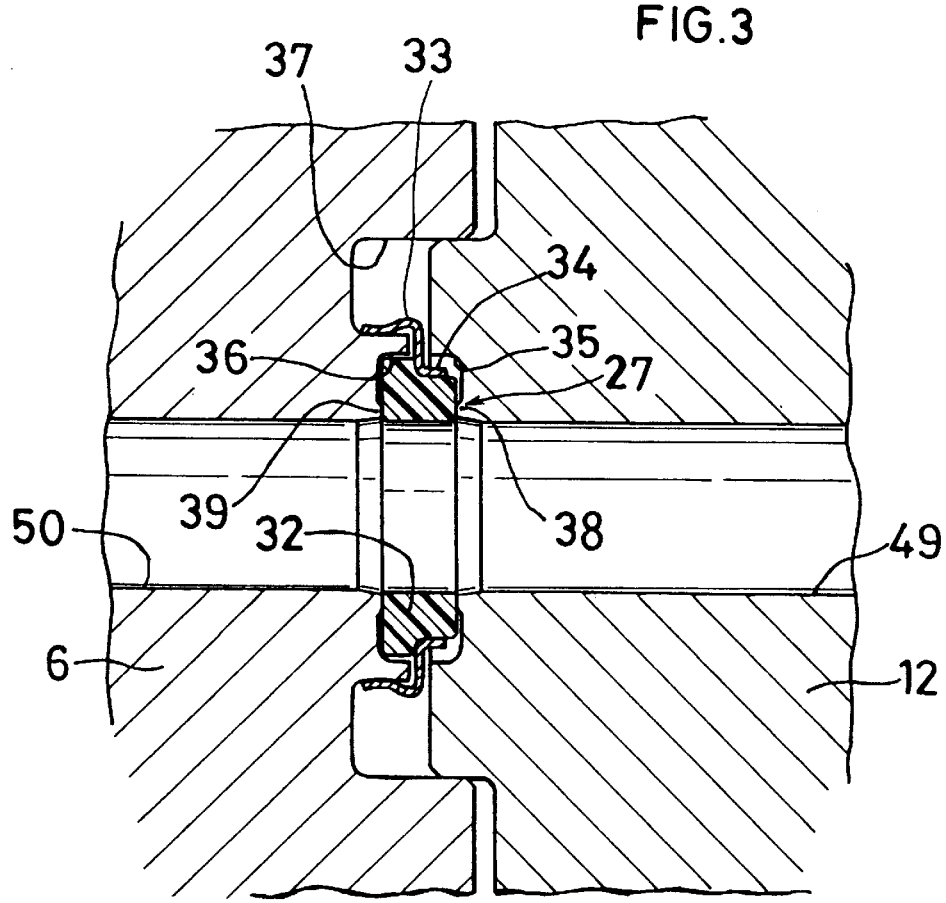
FIG. 3 is an enlarged view in vertical section of a seal portion.
Figure 5:
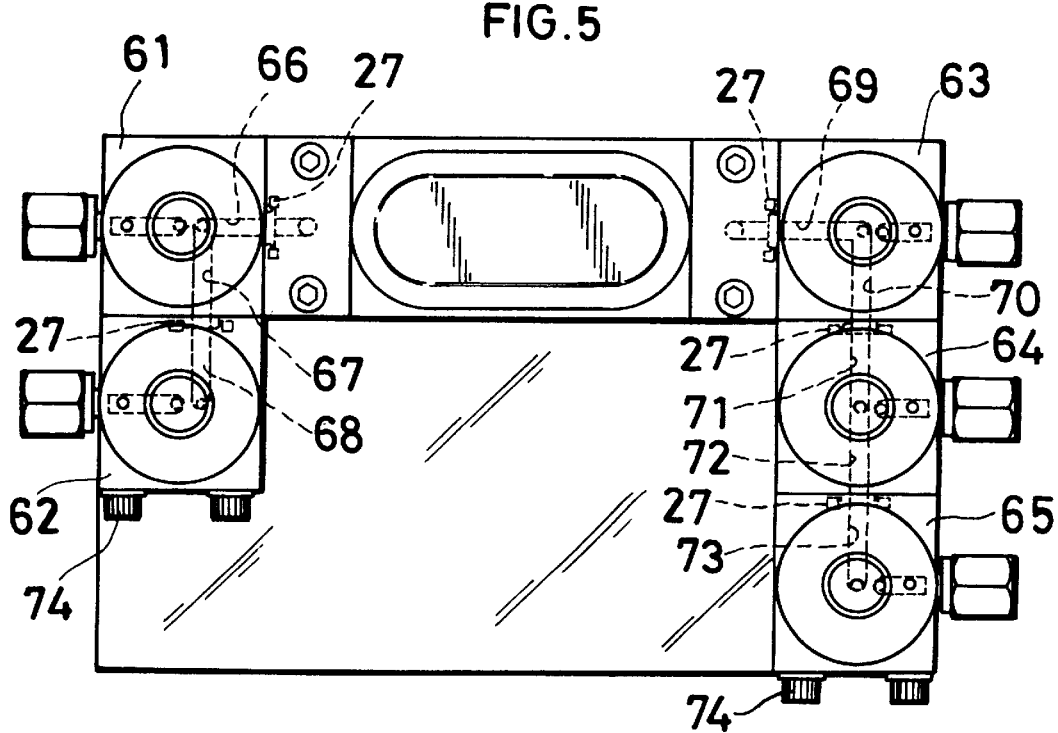
FIG. 5 is a plan view showing another fluid control device embodying the invention and having an increased number of on-off valves.

FIG. 5 shows an embodiment of pattern of FIG. 4, (c). With reference to this drawing, arranged at the inlet side of a regulator 3 are a main fluid on-off valve 61 having a bypass channel 67 orthogonal to a rightwardly opened outlet channel 66, and a purge fluid on-off valve 62 having an outlet channel 68 in communication with the bypass channel 67. Arranged at the outlet side of the regulator 3 are a main channel on-off valve 63 having a bypass channel 70 orthogonal to a leftwardly opened inlet channel 69, a vent on-off valve 64 having an inlet channel 71 in communication with the bypass channel 70 of the main channel on-off valve 63 and a bypass channel 72 in communication with the inlet channel 71, and an evacuating on-off valve 65 having an inlet channel 73 communicating with the bypass channel 72 of the valve 64. The on-off valves 61, 62 at the inlet side are joined to each other with screws 74 driven in sideways, and those 63–65 at the outlet side are joined to one another with like screws 74. A seal 27, the same as the one shown in FIG. 3, is provided between the adjacent on-off valves 61, 62, as well as between the adjacent valves 63, 64, 65.

In the case of the patterns of FIG. 4, (b), (d) and (e) also, on-off valves are made to communicate with one another in the same manner as in FIG. 5, although not shown, to provide flow channels in accordance with the number of on-off valves. The five paterns shown in FIG. 4 are almost all patterns of fluid flow through fluid control devices. Of these patterns, the most suitable is selected in which the fluid is replaced or supplied reliably and which is advantageous for the process of fabricating semiconductors.

Figure 6:
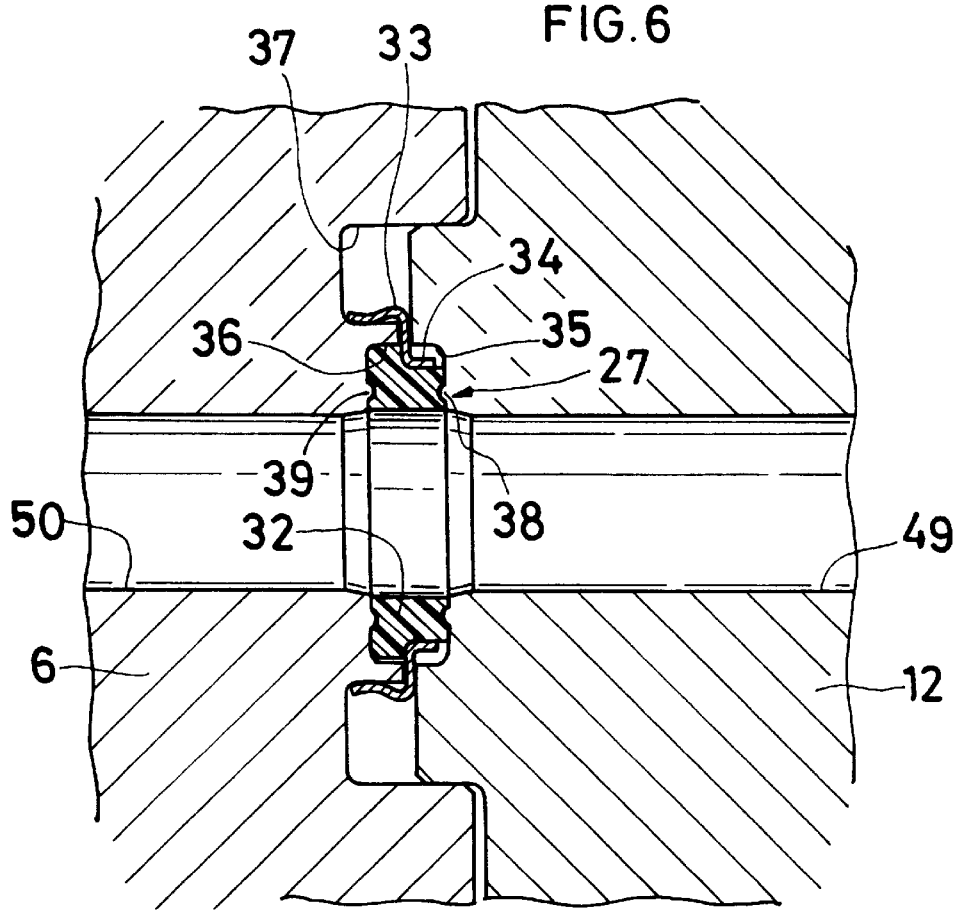
FIG. 6 is an enlarged view in vertical section showing another embodiment of seal portion.
Figure 7:
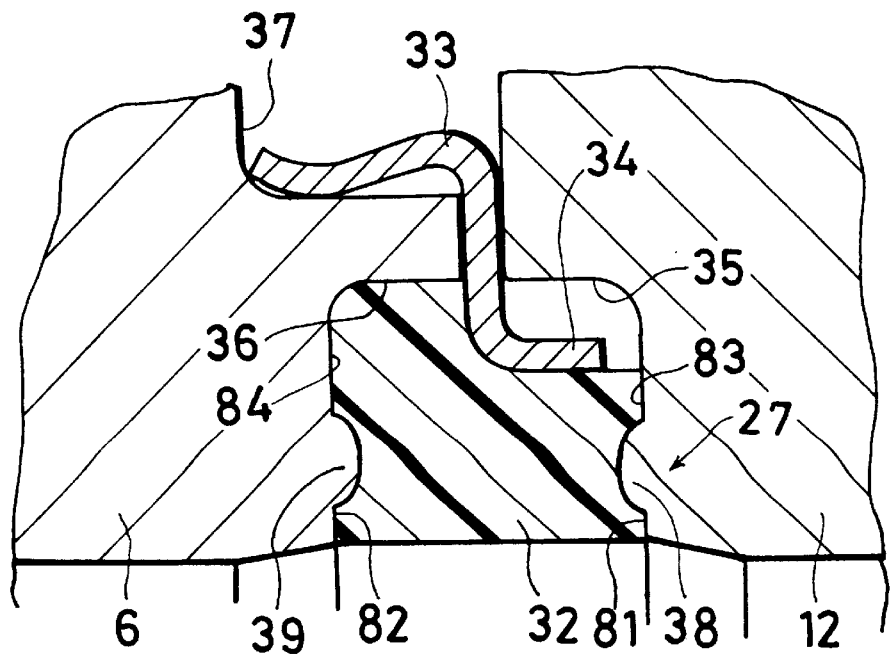
FIG. 7 is an enlarged fragmentary view in vertical section of FIG. 6.

FIGS. 6 and 7 show a modification of seal portion. With reference to the seal portion 27 shown, the abutting end faces of the lower channel block 12 and the body 6 of the first on-off valve 2 include inner flat faces 81, 82 substantially perpendicular to the axis of the channels 49, 50 and positioned inside gasket holding annular projetions 38, 39, respectively, and outer flat faces 83, 84 substantially perpendicular to the axis and positioned outside the projections 38, 39. The inner flat faces 81, 82 are positioned axially closer to each other than the respective outer flat faces 83, 84 by a small distance (about 0.02 mm).

As the screw 22 is tightened, the extremity of each of the annular projections 38, 39 first comes into contact with the end face of the gasket 32 opposed thereto. At this time, a clearance is present between the inner flat face 81 (82) of the block 12 (valve body 6) and the right (left) end face of the gasket 32, and a clearance greater than this clearance is present between the outer flat face 83 (84) and the right (left) end face of the gasket 32. Furthermore, a still greater clearance is present between the upper and lower portions of the abutting end face of the valve body 6 and the abutting end face upper and lower portions of the channel block 12. Accordingly, as the screw is tightened, the gasket 32 deforms, the clearance between the inner flat face 81 (82) and the right (left) end face of the gasket 32 diminishes to zero first, and the clearance between the outer flat face 83 (84) and the right (left) end face of the gasket 32 subsequently reduces to zero. When the screw is completely tightened up, the clearance between the abutting end face upper and lower portions of the valve body 6 and those of the channel block 12 diminishes to zero. At this time, the inner flat faces 81, 82 are in intimate contact with respective inner peripheral portions of opposite faces of the gasket 32, the inner periphery of the body 6 of the first on-off valve 2 and the inner periphery of the left lower channel block 12 become substantially flush with the inner periphery of the gasket 32, and any fluid trapping recess or cavity no longer remains.

Figure 8:
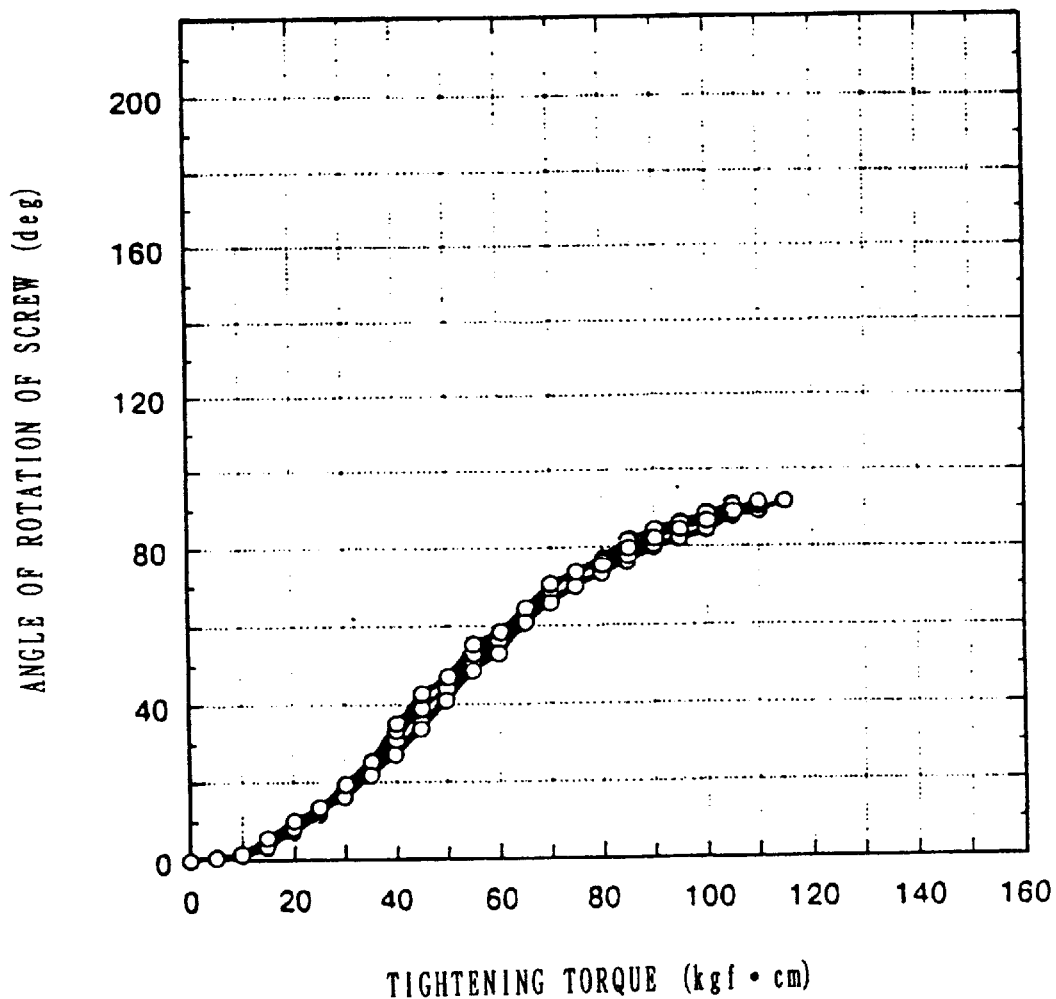
FIG. 8 is a graph showing the relationship between the tightening torque and the angle of rotation of a screw, involved in tightening a seal portion of FIGS. 6 and 7 with the screw.

FIG. 8 is a graph showing the relationship between the tightening torque and the angle of rotation of the screw 22, involved in tightening the seal portion shown in FIGS. 6 and 7 with the screw 22. The graph reveals that the slope of the tightening torque alters when the torque is about 70 kgf·cm. This indicates the intimate contact of the inner flat faces 81, 82 with the opposite end faces of the gasket 32, creating a suitable feeling of tightening and producing an effect of enhanced tightening.

Figure 9:
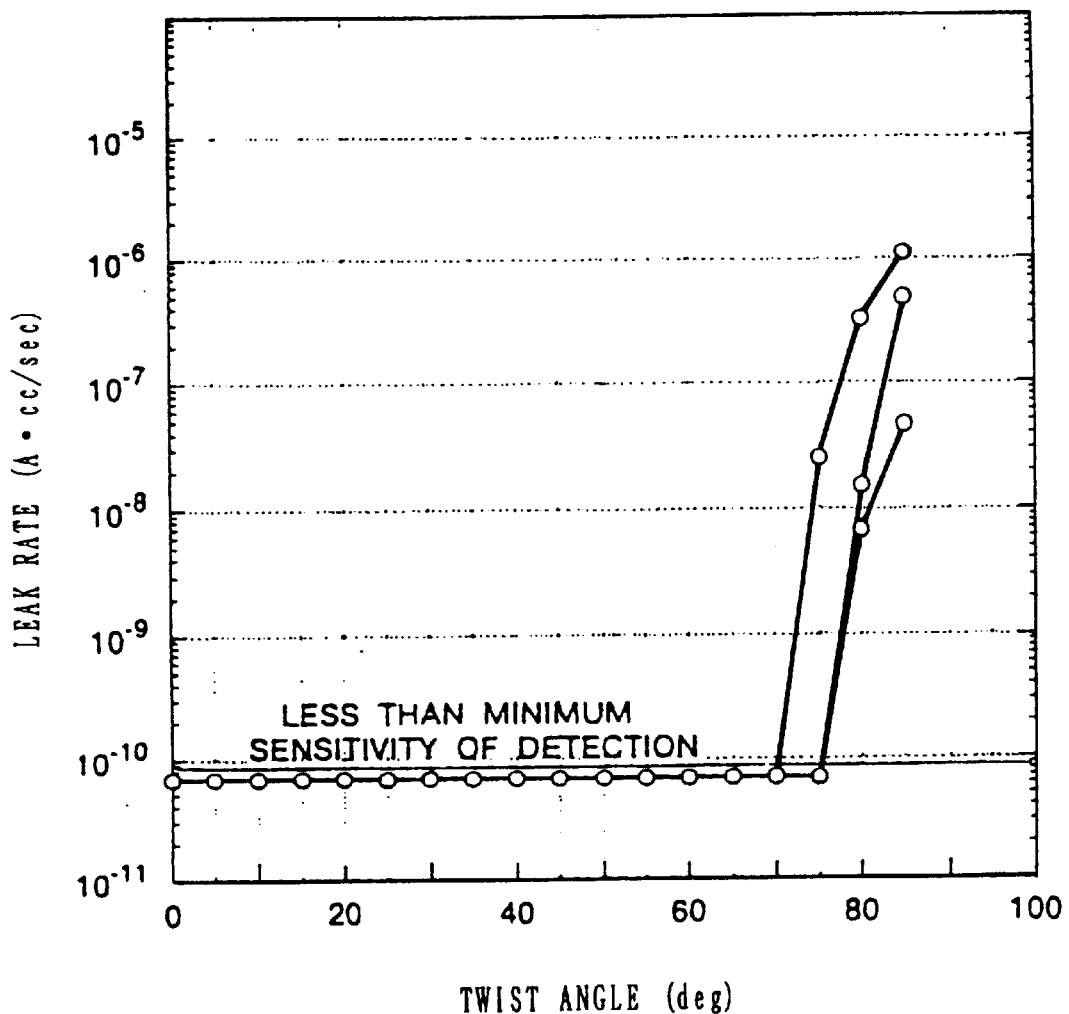
FIG. 9 is a graph showing the result of a torsional leak test conducted for the seal portion of FIGS. 6 and 7.

FIG. 9 is a graph showing the result of a torsional leak test conducted for the seal portion 27 shown in FIGS. 6 and 7. The seal portion 27 was checked for leaks by twisting the first on-off valve 2 relative to the left lower channel block 12 in a direction to loosen the seal portion. The graph reveals that no leak occurred until the twist angle increased to 70 deg, hence an exceedingly high sealing property.

Figure 10:
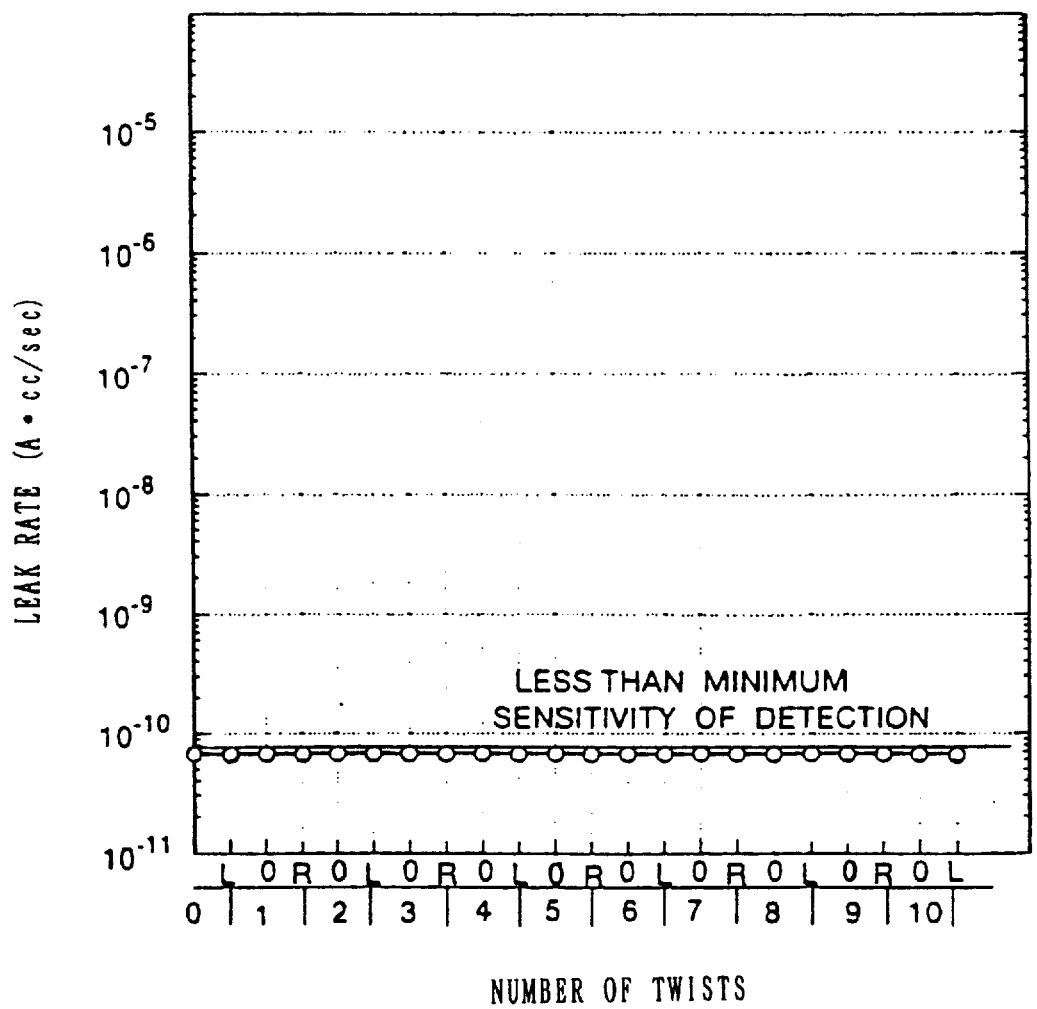
FIG. 10 is a graph showing the result of another torsional leak test conducted for the seal portion of FIGS. 6 and 7.

FIG. 10 is a graph showing the result of another torsional leak test conducted for the seal portion 27 shown in FIGS. 6 and 7. The seal portion 27 was checked for leaks by rotating the valve 2 leftward (L) and rightward (R) repeatedly in succession through a twist angle of 10 deg. The graph reveals that no leak occurred even when the valve was rotated repeatedly ten times, indicating an extremely high sealing property against repeated torsion.

The seal portion 27 of FIGS. 3 and 6 was further checked for external leak rate by the buildup method using a superhigh vacuum tester. The external leak rate was not greater than $10^{-14}$ atm·cc/sec, hence extremely high fluid tightness against external leaks.

With the seal portion 27 shown in FIGS. 6 and 7, the deformation of the inner edge portions of the gasket 32 is smaller than in the arrangement of FIG. 3 wherein the gasket holding annular projections 39, 38 bear on the inner edge portions of the gasket 32. Thus, the seal portion 27 has the advantage that the inner periphery of the gasket 32 is free of creasing. In the case of the foregoing embodiments, the gasket 32 and the gasket holding annular projections 39, 38 are so dimensioned that when the seal portion is properly tightened up, no clearance remains between the gasket 32 and the inner flat faces 81, 82, and between the gasket and the outer flat faces 83, 84. The circular-arc face of each of the annular porjections 39, 38 may partly include a straight portion. The circular-arc face may be straight in sectional configuration instead of having a circular-arc section in the vicinity of its extremity. Although FIGS. 6 and 7 show that the body 6 of the first on-off valve 2 and the left lower channel block 12 each have an inwardly tapered (i.e., outwardly flaring) inner periphery near the abutting end face thereof, the combined inner face extending from the inner periphery of the valve body 6 to the inner periphery of the channel block 12 via the inner periphery of the gasket 32 may be completely straight with the tapers eliminated.

What is claimed is:

1. In combination, a fluid control device having a regulator for regulating a flow rate or pressure, a connection member connected to the regulator with each of said regulator and said connection member having transversely opened channels, and means for detachably connecting said regulator in said combination, said connection means including an upper connector integral with said regulator and having a channel in communication with the regulator and whose open end is downwardly directed, a lower connector integral with said connection member and having a channel in communication with the connection member and whose open end is upwardly directed, the upper connector overlapping the lower connector with the downwardly opened channel end of said upper connector being in communication, with the upwardly opened channel end of said lower connector, and means for removably connecting said upper connector to said lower connector, said connecting means comprising:

a screw screwed in from above the upper connector joining said upper connector to the lower connector, a seal provided between the upper connector and the lower connector including an annular gasket interposed between abutting end faces of the upper connector and the lower connector around said open channel ends therein, recesses surrounding said open channel ends in said abutting end faces of said upper connector and said lower connector cooperating to define a space for receiving said gasket, means for securing said gasket in said space including a retainer having claws for holding an outer periphery of the gasket to one of said upper connector and said lower connector, annular projections formed on said end faces of said upper connector and said lower connector in opposing relation to end faces of said gasket and being operative to deform said gasket into sealing engagement with die end faces of said upper and lower connectors upon tightening said screw, said annular projections being each radially spaced from said open ends of said channels to define concentrically disposed inner flat faces and outer flat faces on opposite sides of said projections, and wherein said inner flat faces are mutually axially spaced closer than said outer flat faces.

* * * * *